Nov. 6, 1956

L. A. RICHARDS 2,769,668

IRRIGATION TUBES

Filed Oct. 11, 1954

INVENTOR.
LORENZO A. RICHARDS
BY
ATTORNEY

United States Patent Office 2,769,668
Patented Nov. 6, 1956

2,769,668

IRRIGATION TUBES

Lorenzo A. Richards, Riverside, Calif.

Application October 11, 1954, Serial No. 461,383

4 Claims. (Cl. 299—104)

My invention relates to irrigation tubes and included in the objects of my invention are:

First, to provide an irrigation tube formed of rubber or plastic material having a plurality of ports through which has been threaded yarn formed of spun glass or plastic material such as nylon to form tortuous exits of capillary size through which water may seep from the tube.

Second, to provide an irrigation tube of this class in which the water is effectively prevented from spraying therefrom.

Third, to provide an irrigation tube of this class wherein each outlet is provided with a filter whereby the irrigation tube does not clog even after long periods of use.

Fourth, to provide an irrigation tube of this class wherein the flow control yarn is sewn, or stitched, diametrically through the tube.

With the above and other objects in view as may appear hereinafter, reference is directed to the accompanying drawings, in which.

Figure 1:
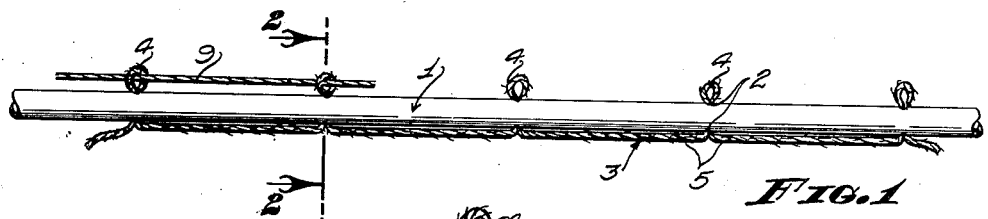
Figure 1 is a fragmentary elevational view of an irrigation tube incorporating my invention.
Figure 2:
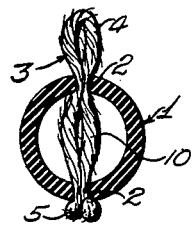
Figure 2 is an enlarged transverse sectional view through 2—2 of Fig. 1.

Reference is first directed to Fig. 1. The construction here shown is particularly suited for small diametered tubing, for example from a quarter to a half inch in diameter. A length of rubber or plastic tubing 1 is pierced by a series of perforations 2 through each of which is threaded one or more strands of yarn 3, comprising a multiplicity of fibres forming capillary passages.

This can most readily be done by forming diametrically disposed perforations 2 with a needle (not shown) which carries the yarn 3. The yarn may be a continuous strand so that upon stitching the yarn a series of loops 4 are formed along one side of the tube 1 and connecting sections 5 are disposed along the opposite side of the tube.

The yarn is formed of glass or plastic fibers such as nylon fibers, so that the yarn does not rot or disintegrate when the irrigation tube is stretched along or buried in the ground and left for long periods of time.

The number and arrangement of the perforations 2 depend upon the amount of water it is desired to discharge in a selected length of irrigation tube.

The wall thickness of the irrigation tubing should be approximately one-sixteenth inch; although this is not critical. The thickness should be sufficient to give adequate support to the yarn traversing the tube wall and resist tearing. In the manufacture of irrigation tubes of large diameter; that is in excess of one-half inch, particularly if the irrigation tube is supplied with water at low pressure, the irrigation tube may be constructed as shown in Figs. 3 and 4 wherein the tube 6 may have relatively thin walls provided with diametrically disposed ribs 7 through which the yarn is threaded.

Figure 3:
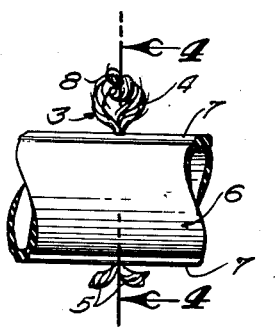
Figure 3 is a fragmentary elevational view of a modified form of my irrigation tube.
Figure 4:
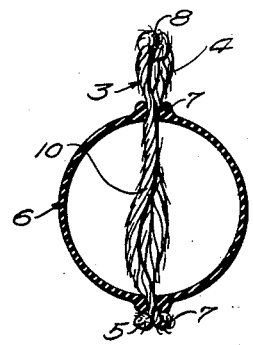
Figure 4 is a transverse sectional view through 4—4 of Fig. 3.

If desired, the loops 4 of the yarn may be knotted as indicated by 8 in Figs. 3 and 4, to resist being pulled through the tube after the yarn is sewn in place. In this regard it should be noted that yarn may be readily formed with knotlike enlargements at selected intervals and these forced through the irrigation tube. Or as indicated fragmentarily in Figure 1 a retainer string 9 may be provided to prevent the loops 4 from pulling out.

It will be observed that the fibrous character of the yarn provides a multitude of tortuous exit passages of capillary dimensions at each perforation and that the portions 10 of the yarn extending diametrically across the irrigation tube provide extremely large filtering areas as compared with the effective passage area. Consequently, clogging of these passages is almost an impossibility so that the irrigation tube is capable of functioning for long periods of time without appreciable clogging of the exit passages. Furthermore, the flow of water through the tube past the traversing portions 10 of the yarn tend to wash excessive accumulations away.

Although I have shown certain embodiments of my invention, I do not wish to be limited thereto, but desire to include in the scope of my invention all the novelty inherent in the appended claims.

I claim:

1. An irrigation tube comprising: a length of rubber-like tubing traversed by a plurality of fibrous strands penetrating the diametrically opposite walls of the tubing at spaced points therealong to provide a series of spaced tortuous exit passages for the seepage of water.

2. An irrigation tube comprising: a length of rubber-like tubing; and multiple fiber yarn strands threaded transversely through the walls of the tubing to form water seepage passages therethrough.

3. An irrigation tube comprising: a length of rubber-like tubing; and a plurality of yarn strands threaded transversely through the walls of the tubing to form water seepage passages therethrough, said strands including portions extending across the tubing between the walls thereof exposed to water flowing in said tubing.

4. An irrigation tube comprising: a length of rubber-like tubing; and a plurality of yarn strands extending through diametrically opposite walls of said tubing to form seepage channels and bridging the interior thereof between said walls to form filter means preceding said seepage channels.

References Cited in the file of this patent

UNITED STATES PATENTS

| | | |
|---|---|---|
| 1,023,063 | Bassford | Apr. 9, 1912 |
| 1,456,977 | Geib | May 29, 1923 |
| 1,489,071 | Fairfield | Apr. 1, 1924 |
| 1,673,169 | Ward | June 12, 1928 |
| 1,996,531 | Thrasher | Apr. 2, 1935 |
| 2,471,949 | Gilowitz | May 31, 1949 |
| 2,566,833 | Healy | Sept. 4, 1951 |